US011866299B2

(12) United States Patent
Kubo et al.

(10) Patent No.: US 11,866,299 B2
(45) Date of Patent: Jan. 9, 2024

(54) ELEVATOR APPARATUS

(71) Applicant: Hitachi, Ltd., Tokyo (JP)

(72) Inventors: Yosuke Kubo, Tokyo (JP); Tomohisa Hayakawa, Tokyo (JP); Hidetaka Zama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 54 days.

(21) Appl. No.: 17/624,619

(22) PCT Filed: Jul. 23, 2019

(86) PCT No.: PCT/JP2019/028811
§ 371 (c)(1),
(2) Date: Jan. 4, 2022

(87) PCT Pub. No.: WO2021/014559
PCT Pub. Date: Jan. 28, 2021

(65) Prior Publication Data
US 2022/0259009 A1 Aug. 18, 2022

(51) Int. Cl.
*B66B 5/22* (2006.01)
*B66B 5/06* (2006.01)

(52) U.S. Cl.
CPC . *B66B 5/22* (2013.01); *B66B 5/06* (2013.01)

(58) Field of Classification Search
CPC .................................... B66B 5/22; B66B 5/06
See application file for complete search history.

(56) References Cited

U.S. PATENT DOCUMENTS

| | | | | |
|---|---|---|---|---|
| 6,564,907 | B1 | 5/2003 | Sasaki et al. | |
| 8,631,909 | B2 * | 1/2014 | Draper | B66B 5/06 187/373 |

FOREIGN PATENT DOCUMENTS

| | | | | | |
|---|---|---|---|---|---|
| EP | 1213248 | A1 * | 6/2002 | B66B 5/22 |
| EP | 2 154 096 | A1 | 2/2010 | |
| JP | 2000-086110 | A | 3/2000 | |
| JP | 2009-298508 | A | 12/2009 | |
| JP | 2013-189283 | A | 9/2013 | |
| WO | 2008/149413 | A1 | 12/2008 | |
| WO | WO-2011146050 | A1 * | 11/2011 | B66B 5/044 |

OTHER PUBLICATIONS

Japanese Office Action received in corresponding Japanese Application No. 2021-534448 dated Jan. 10, 2023.
International Search Report of PCT/JP2019/028811 dated Sep. 10, 2019.

* cited by examiner

*Primary Examiner* — Diem M Tran
(74) *Attorney, Agent, or Firm* — MATTINGLY & MALUR, PC

(57) ABSTRACT

An elevator apparatus provided with a safety gear is disclosed which is adapted to prevent the turn-on of a brake state detection switch during power outage even while being operated by an electric actuator. This elevator apparatus includes: a safety gear 5 disposed at a car 1; and an electric actuator 3 for operating the safety gear. The elevator apparatus further includes a brake state detection switch 6 for detecting a brake state of the safety gear. The brake state detection switch is operated by a mechanism 8 which operates the safety gear with an operation of the electric actuator. The brake state detection switch is in an off state for a displacement of the mechanism during interruption of power supply. The brake state detection switch is turned on for the displacement of the mechanism during the brake of the safety gear.

9 Claims, 2 Drawing Sheets

ELEVATOR APPARATUS

TECHNICAL FIELD

The present invention relates to an elevator apparatus provided with a safety gear operated by an electric actuator.

BACKGROUND ART

The elevator apparatus is provided with a governor and the safety gear such that an elevating speed of a car is constantly monitored to bring the car to an emergency stop when the car goes into a predetermined over-speed state. The car and the governor are generally interconnected by means of a governor rope. When the over-speed state of the car is detected, the governor drives the safety gear on the car by constraining the governor rope. Thus, the car is brought to the emergency stop.

In such an elevator apparatus, the governor rope as a long object is installed in a hoistway. This results in difficulty in space saving and cost reduction. In a case where the governor rope swings, the governor rope tends to interfere with structural objects in the hoistway.

On the other hand, a safety gear not using the governor rope is proposed.

A technique set forth in Patent Literature 1 is known as a conventional technique related to the safety gear not using the governor rope. According to the conventional technique, a brake unit including a wedge-shaped brake shoe is disposed at a lower part of the car. A brake link is connected to the brake shoe. When a solenoid operates in response to a commend from a controller, the brake link is moved up by a mechanism operatively connected with the solenoid. Thus, the brake shoe is pulled up, braking the car.

CITATION LIST

Patent Literature

Patent Literature 1: Japanese Patent Application Laid-Open No. 2013-189283

SUMMARY OF INVENTION

Technical Problem

In the existing safety gear operated by the electric actuator such as a solenoid as described above encounters the following problem, if the safety gear is provided with a brake state detection switch for detecting that the switch gear is in a brake state, the brake state detection switch is turned on when the safety gear goes into the brake state due to power outage. Therefore, the elevator cannot be restarted until the on-state of the brake state detection switch is cancelled by a professional engineer.

Accordingly, it is an object of the present invention to provide an elevator apparatus provided with the safety gear which can prevent the brake state detection switch from turning on during the power outage even while the safety gear is operated by the electric actuator.

Solution to Problem

In order to solve the above problem, an elevator apparatus according to the present invention includes: a safety gear disposed at a car; and an electric actuator for operating the safety gear, further including a brake state detection switch for detecting a brake state of the safety gear, and has a configuration wherein the brake state detection switch is operated by a mechanism which operates the safety gear with an operation of the electric actuator, wherein the brake state detection switch is not in an on state for a displacement of the mechanism during interruption of power supply, and the brake state detection switch is turned on for the displacement of the mechanism during a brake operation of the safety gear.

Advantageous Effects of Invention

According to the present invention, while ensuring the emergency brake operation of the safety gear, the brake state detection switch is not turned on during the power outage even though the electric actuator is in operation.

Problems, features and effects other than those described above will become apparent from the following description of the embodiment.

DESCRIPTION OF EMBODIMENT

Figure 1:
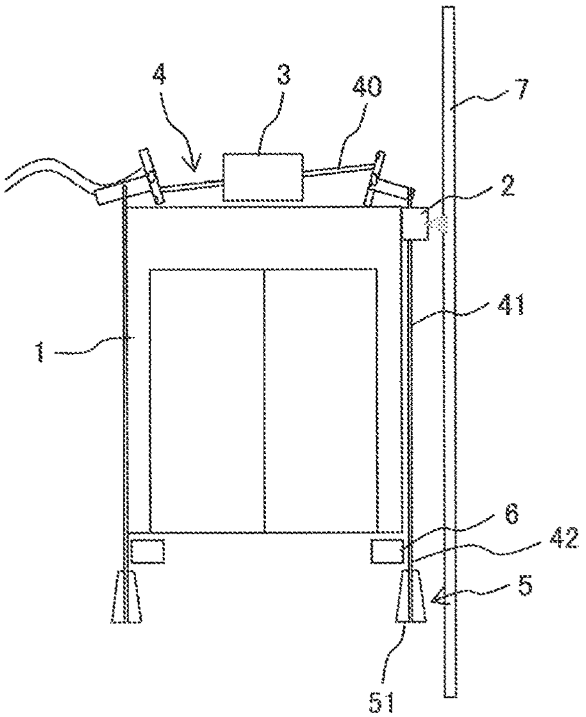
FIG. 1 is a schematic configuration diagram showing an elevator apparatus according to an embodiment hereof.

An embodiment of the present invention will hereinbelow be described with reference to the accompanying drawings. In the drawings, the same reference numerals are used to refer to the same components or components having similar functions.

FIG. 1 a schematic configuration diagram showing an elevator apparatus according to an embodiment hereof.

As shown in FIG. 1, an elevator apparatus includes: a car 1; a position sensor 2; an electric actuator 3; a link mechanism 4; a safety gear 5; and a brake state detection switch 6.

The car 1 is hung on a main rope (not shown) in the hoistway disposed in a building and is slidably engaged with a guide rail 7 via a guide device. When the main rope is frictionally driven by a drive unit (traction machine), the car 1 is moved up and down in the hoistway.

The position sensor 2 is disposed at the car 1 for detecting a position of the car 1 in the hoistway and for constantly detecting an elevating speed of the car 1 based on the detected position of the car 1. Therefore, an elevating speed exceeding a predetermined over-speed of the car can be detected by the position sensor 2.

According to the embodiment, the position sensor 2 is provided with an image sensor so that the position and speed of the car are detected based on image information, which is acquired by the image sensor, on a surface condition of the guide rail 7. For example, the position of the car 1 is detected by comparing the image information acquired by the image sensor with the image information on the surface condition of the guide rail 7 which is acquired in advance and stored in a storage unit.

Incidentally, a rotary encoder disposed at the car and rotating with the movement of the car can be used as the position sensor 2.

According to the embodiment, the electric actuator 3 is an electromagnetic actuator which is disposed a top the car 1. The electromagnetic actuator includes, for example, a movable piece or a movable lever driven by a solenoid or an electromagnet. The electric actuator 3 operates when the position sensor 2 detects a predetermined over-speed state of the car 1 and brings the safety gear 5 into a brake state by displacing the link mechanism 4.

The link mechanism 4 includes: a link shaft 40 driven by the electric actuator 3; a lifting link 41 operably linked to the link shaft 40; and a lifting rod 42 connected to the lifting link 41. In response to the operation of the electric actuator 3, the link mechanism 4 substantially concurrently pulls up the lifting rods 42 disposed on the left and the right of the car 1 via the lifting link 41. When braking elements 51 of the safety gear 5 as mounted to the lifting rod 42 are pulled up to a braking position, the braking elements 51 hold the guide rail 7 therebetween.

The safety gears 5 are disposed at the car 1, one on either side of the car. As will be described hereinafter, the braking elements 51 of the safety gear 5 are movable between the braking position and a non-braking position. The braking elements hold the guide rail 7 at the braking position. When relatively raised by a downward movement of the car 1, a braking force is generated by a frictional force acting between the braking elements 51 and the guide rail 7. Thus, the safety gear 5 operates when the car 1 gets into the over-speed state, bringing the car 1 to the emergency stop.

The brake state detection switch 6 is fixed to the car 1 and detects that the safety gear 5 disposed on either side of the car 1 are in a brake state. A mechanical switch, such as a microswitch, where electric contacts are opened or closed by mechanical manipulation via a button or lever is used as the brake state detection switch 6. The brake state detection switch 6 is fixed to a main body of the car 1 or to an upper part of the safety gear 5.

The elevator apparatus of the embodiment includes a so-called rope-less governor system which does not use the governor rope. When the elevating speed of the car 1 exceeds a rated speed to reach a first over-speed (e.g., a speed not more than 1.3 times the rated speed), the elevator apparatus shuts off power to the drive unit (traction machine) for driving a traction sheave and power to a control unit for controlling the drive unit. Furthermore, when a descending speed of the car 1 reaches a second over-speed (e.g., a speed not more than 1.4 times the rated speed), the elevator apparatus brings the car 1 to the emergency stop by electrically operating the electric actuator 3 disposed at the car 1 to operate the safety gear 5.

According to the embodiment, the rope-less governor system includes: the position sensor 2 including the image sensor; and a safety controller which determines the over-speed state of the car 1 based on an output signal from the position sensor 2. This controller measures the speed of the car 1 based on the output signal from the position sensor 2. When determining that the measured speed has reached the first over-speed, the controller outputs a command signal to shut off power to the drive unit (traction machine) and power to the control unit for controlling the drive unit. Upon determining that the measured speed has reached the second over-speed, the safety controller outputs a command signal to drive the electric actuator 3.

The rope-less governor system does not limit the position sensor to the image sensor but can also use a sensor (such as a rotary encoder) which is disposed at the car and outputs a signal according to the movement of the car.

Next, the description is made on a mechanism to turn on the brake state detection switch 6.

Figure 2:
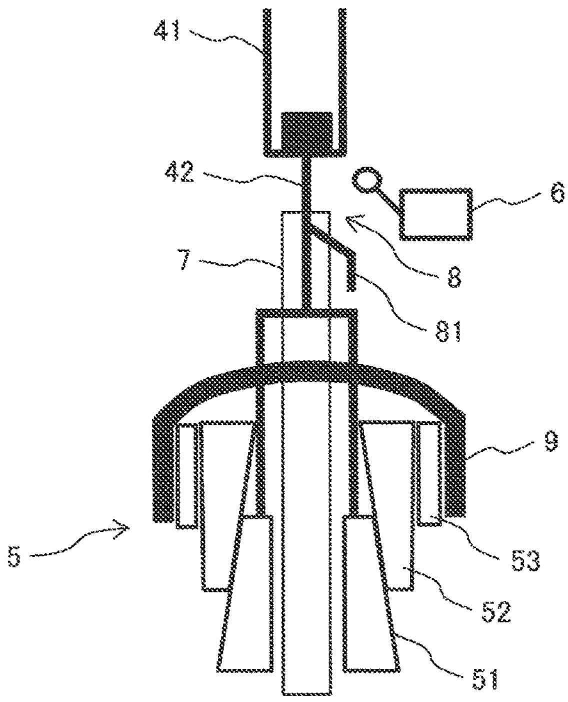
FIG. 2 is a configuration diagram showing a turn-on mechanism of a brake state detection switch according to the embodiment hereof.

FIG. 2 is a configuration diagram schematically showing a turn-on mechanism of the brake state detection switch according to the embodiment.

As described above, the link mechanism 4 (FIG. 1) includes the lifting link 41 and the lifting rod 42. The lifting link 41 is displaced according to the operation of the electric actuator 3. The lifting link 41 is connected to an upper end of the lifting rod 42. A lower end of the lifting rod 42 is connected to the braking elements 51 of the safety gear 5. When the lifting link 41 is displaced upward, the lifting rod 42 is also displaced upward. With this moving, the braking elements 51 are displaced upward.

The safety gear 5 includes: the braking elements 51; inclined bodies 52; and an elastic body 53.

The braking element 51 has a wedge-like configuration and is progressively decreased in width toward the top. As for the braking element 51, its side surface opposed to the guide rail 7 substantially defines a vertical plane while its side surface away from the guide rail 7 defines a smooth surface. The braking element 51 is vertically movable between the braking position and the non-braking position. In FIG. 2, the braking element 51 is located at the non-braking position so that the vertical plane thereof is spaced away from the guide rail 7. When the braking element is located at the braking position, the vertical plane thereof is in contact with the guide rail 7 so that the braking element 51 holds the guide rail 7.

The inclined body 52 is disposed on a side away from the guide rail with respect to the braking element 51. The inclined body 52 has a wedge-like configuration and is progressively decreased in width toward the bottom. As for the inclined body 52, its side surface proximal to the braking element defines an inclined smooth surface while its side surface away from the braking element substantially defines a vertical plane.

The elastic body 53 is disposed on the outer side of the inclined body 52, applying an elastic force to the inclined body 52. For example, the elastic body 53 is formed of a U-shaped flat spring which holds a pair of braking elements 51 and a pair of inclined bodies 52 therebetween.

According to the embodiment, the braking elements 51, the inclined bodies 52, and the elastic body 53 are disposed in a frame 9.

When turned on by a switch turn-on mechanism 8, the brake state detection switch 6 detects that the safety gear 5 is in the brake state.

The switch turn-on mechanism 8 includes: the lifting rod 42; and a switch turn-on bracket 81 which is a member projected from the lifting rod 42 and coming into and out of contact with the brake state detection switch 6 according to the displacement of the lifting rod 42.

The switch turn-on bracket 81 is disposed on the lifting rod 42 in a manner that the switch turn-on bracket 81 stays out of contact with the brake state detection switch 6 in a state where the lifting rod 42 is displaced to a first displacement position in response to the operation of the electric actuator 3 and that the switch turn-on bracket comes into contact with the brake state detection switch 6 when the lifting rod 42 is displaced to a second displacement position in conjunction with a relative upward movement of the braking element 51 due to the further downward movement of the car 1 with the braking elements 51 holding the guide rail 7 therebetween. Thus, the switch turn-on mechanism 8 maintains the brake state detection switch 6 in the off state when the electric actuator 3 operates in response to the interruption of power supply to the elevator apparatus. Further, the switch turn-on mechanism 8 also turns on the brake state detection switch 6 when the safety gear 5 goes into the brake state.

The operation of turning on the brake state detection switch 6 by the switch turn-on bracket 81 is described with reference to FIGS. 2 to 4.

Figure 3:
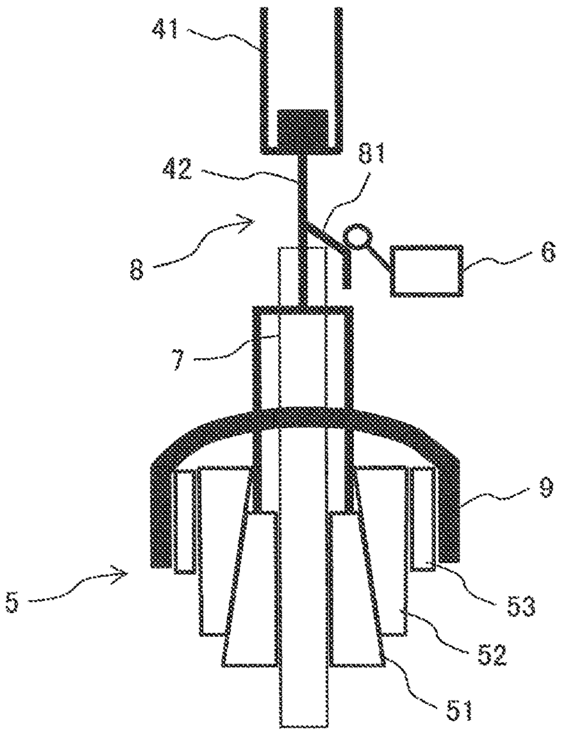
FIG. 3 is a diagram showing a positional relation between a switch turn-on bracket and a brake state detection switch at the time of interruption of power supply.

FIG. 3 is a diagram showing a positional relation between the switch turn-on bracket 81 and the brake state detection switch 6 during the interruption of power supply. FIG. 4 is a diagram showing a positional relation between the switch turn-on bracket 81 and the brake state detection switch 6 during the emergency brake operation. The above-described FIG. 2 shows a positional relation between the switch turn-on bracket 81 and the brake state detection switch 6 during a normal operation.

During the normal operation, the electric actuator 3 is not in operation. As shown in FIG. 2, the braking element 51 of the safety gear 5 is away from the guide rail 7 or in a non-brake state.

When the power supply to the elevator apparatus is interrupted due to commercial power outage, the electric actuator 3 comes into operation. When the electric actuator 3 operates, the lifting link 41 is displaced so that the lifting rod 42 is raised. At this time, the lifting rod 42 is displaced to the first displacement position as shown in FIG. 3 while the switch turn-on bracket 81 retains contactless relation with the brake state detection switch 6.

In conjunction with the upward movement of the lifting rod 42, the braking element 51 of the safety gear is also moved up to be brought into contact with the guide rail 7. However, the car 1 is not moved due to the power outage. When the power supply is restored from the interruption of power supply, or when the electric actuator 3 returns again to the non-operative state or normal state so that the lifting rod 42 is lowered due to power recovery, the braking element 51 is in the non-brake state as spaced away from the guide rail 7 as shown in FIG. 2.

As just described, the lifting rod 42 is raised during the interruption of power supply due to power outage, but the switch turn-on bracket 81 does not turn on the brake state detection switch 6. This permits the elevator apparatus to be restarted without requiring the professional engineer to cancel the on state of the brake state detection switch 6.

When the descending speed of the car 1 reaches the second over-speed so that the electric actuator 3 operates, the lifting link 41 is displaced to raise the lifting rod 42 while the braking element 51 of the safety gear 5 is also raised to be brought into contact with the guide rail 7 as shown in FIG. 3. When the car 1 in this state is lowered further, the braking elements 51 are raised relatively to the car 1 and are horizontally moved as guided by the inclined bodies 52, thus clamping the guide rail 7 therebetween.

Figure 4:
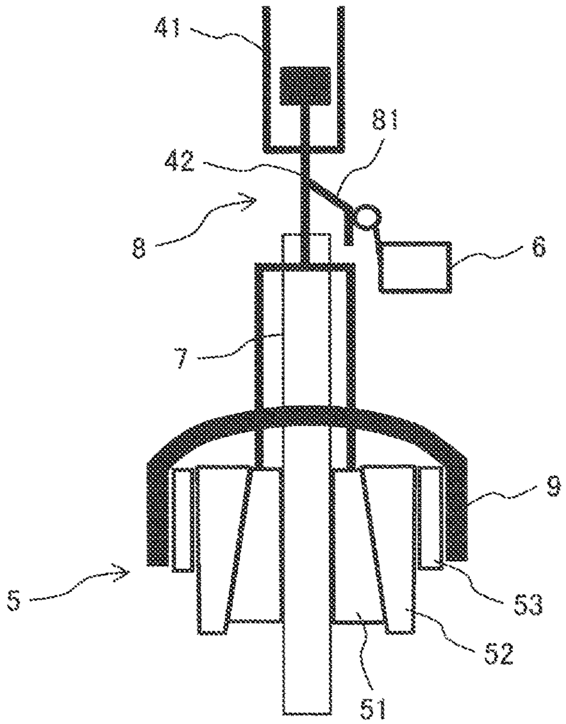
FIG. 4 is a diagram showing a positional relation between the switch turn-on bracket and the brake state detection switch at the time of emergency braking.

In a state shown in FIG. 4, the elastomeric force of the elastic body 53 is applied to the braking element 51 via the inclined body 52 so that a frictional force (proportionality coefficient is "sliding frictional coefficient") is generated between the braking element 51 and the guide rail 7. This makes the car 1 slow down and stop. The lifting rod 42 is pushed upward by the relative upward movement of the braking element 51 to the car 1. Thus, the lifting rod 42 is displaced to the second displacement position. This brings the switch turn-on bracket 81 into contact against the brake state detection switch 6 so that the brake state detection switch 6 is turned on.

In the case where the car 1 is brought to the emergency stop in this manner, the professional engineer performs elevator recovery operations including the cancellation of on-state of the brake state detection switch 6.

According to the embodiment as described above, the brake state detection switch 6, which is a mechanical switch for detecting the brake state of the safety gear 5, is operated by the switch turn-on bracket 81 which is a member disposed on the lifting rod 42 constituting a mechanism for operating the safety gear 5 with an operation of the electric actuator 3. In the case of the displacement of the switch turn-on bracket 81 during the interruption of power supply, the brake state detection switch 6 is retained in the off state. In the case of the displacement of the switch turn-on bracket 81 during the brake of the safety gear 5, the brake state detection switch 6 is turned on by the switch turn-on bracket 81. This ensures the emergency stop operation of the safety gear. During power outage, however, the brake state detection switch 6 is not turned on despite the operation of the electric actuator 3. At power recovery, therefore, the elevator apparatus can be restarted immediately.

According to the embodiment, the brake state detection switch 6 is operated by means of the switch turn-on bracket 81 disposed on the lifting rod 42 connected to the braking element 51. Therefore, a relatively simple configuration can be used for high accuracy setting of the positional relation between the switch turn-on bracket 81 and the brake state detection switch 6 at the time of power outage and of emergency braking. Therefore, the emergency brake operation of the safety gear is ensured while, in the case of power outage, the brake state detection switch 6 is reliably placed in the off state despite the operation of the electric actuator 3.

It is noted that the present invention is not limited to the foregoing embodiment but can include a variety of modifications. For example, the foregoing embodiment is detailed description of the present invention for clarity, but the present invention is not necessarily limited to those including all the components described. A part of the structure of one embodiment can be added with an another structure, replaced with an another structure, or cancelled.

For instance, the electric actuator 3 can be disposed not only on the top of the car 1 but also at the lower part or the lateral part of the car. The electric actuator can also be provided with a linear actuator.

The switch turn-on bracket 81 can be disposed not only on the lifting rod 42 but also at a mechanically movable part, such as the braking element 51, that operates with an operation of the electric actuator 3 in the case of emergency brake operation.

REFERENCE SIGNS LIST

1 . . . car
2 . . . position sensor
3 . . . electric actuator
4 . . . link mechanism
5 . . . safety gear
6 . . . brake state detection switch
7 . . . guide rail
8 . . . switch turn-on mechanism
9 . . . frame
41 . . . lifting link
42 . . . lifting rod
51 . . . braking element
52 . . . inclined body
53 . . . elastic body

The invention claimed is:

1. An elevator apparatus comprising:

a safety gear disposed at a car;

an electric actuator for operating the safety gear; and a brake state detection switch fixed to the car for detecting a brake state of the safety gear, wherein the brake state detection switch is operated by a mechanism which operates the safety gear with an operation of the electric actuator, wherein upon interruption of a power supply of the car, the electric actuator operates the safety gear thereby displacing the mechanism to a first position toward the brake state detection switch, the brake state detection switch remaining off while the moving mechanism is in the first position, and wherein upon braking of the safety gear thereby displacing the mechanism to a second position in contact with the brake state detection switch, the brake state detection switch is turned on.

2. The elevator apparatus according to claim 1, wherein the mechanism includes a mechanically movable part operatively connected to the electric actuator, and wherein the brake state detection switch is operated by the mechanically movable part.

3. The elevator apparatus according to claim 2, wherein the mechanically movable part is a lifting rod operatively connected to a braking element of the safety gear.

4. The elevator apparatus according to claim 2, wherein the mechanically movable part includes a switch turn-on part for turning on the brake state detection switch, and wherein the brake state detection switch is operated by the switch turn-on part.

5. The elevator apparatus according to claim 4, wherein the mechanically movable part is the lifting rod connected to the braking element of the safety gear, and wherein the switch turn-on part is a bracket part projected from the lifting rod.

6. The elevator apparatus according to claim 1, wherein when the power supply is restored from the power supply interruption, the electric actuator returns to its normal state.

7. The elevator apparatus according to claim 1, wherein the brake state detection switch is fixed to the car.

8. The elevator apparatus according to claim 1, wherein the brake state detection switch is a mechanical switch.

9. The elevator apparatus according to claim 1, wherein the electric actuator is an electromagnetic actuator.

* * * * *